(12) United States Patent (10) Patent No.: US 9,399,299 B2
Hermey et al. (45) Date of Patent: Jul. 26, 2016

(54) GUIDE SYSTEM FOR SUPPLY LINES AND A ROBOT WITH A GUIDE SYSTEM

(75) Inventors: Andreas Hermey, Hennef (DE); Ralf Steeger, Lohmar (DE)

(73) Assignee: Igus GmbH, Cologne (DE)

( * ) Notice: Subject to any disclaimer, the term of this patent is extended or adjusted under 35 U.S.C. 154(b) by 290 days.

(21) Appl. No.: 14/009,204

(22) PCT Filed: Mar. 29, 2012

(86) PCT No.: PCT/EP2012/055715
§ 371 (c)(1),
(2), (4) Date: Oct. 1, 2013

(87) PCT Pub. No.: WO2012/130994
PCT Pub. Date: Oct. 4, 2012

(65) Prior Publication Data
US 2014/0033851 A1 Feb. 6, 2014

(30) Foreign Application Priority Data

Apr. 1, 2011 (DE) ..................... 20 2011 004 786 U

(51) Int. Cl.
*F16L 3/00* (2006.01)
*B25J 19/00* (2006.01)
(Continued)

(52) U.S. Cl.
CPC .............. *B25J 19/00* (2013.01); *B25J 19/0025* (2013.01); *H02G 3/0468* (2013.01); *H02G 11/00* (2013.01); *Y10T 74/20311* (2015.01)

(58) Field of Classification Search
CPC ...... B25J 19/00; B25J 19/0025; H02G 11/00; H02G 3/0468; Y10T 74/20311
USPC ........ 248/49, 51; 74/490.2, 490.02; 174/68.1; 414/918
See application file for complete search history.

(56) References Cited

U.S. PATENT DOCUMENTS 7,520,473 B2 * 4/2009 Karlinger ............... H02G 11/00
174/68.1

FOREIGN PATENT DOCUMENTS

DE 102009037515 A1 3/2011
DE 102009037516 A1 * 3/2011 ........... B25J 19/0025
(Continued)

OTHER PUBLICATIONS

English language translation of the PCT International Search Report mailed Aug. 6, 2012, received in corresponding PCT Application No. PCT/EP12/55715, 2 pgs.
(Continued)

*Primary Examiner* — Gwendolyn W. Baxter
(74) *Attorney, Agent, or Firm* — Grossman Tucker Perreault & Pfleger, PLLC

(57) ABSTRACT

A guide system for supply lines for a handling apparatus, in particular for an industrial robot, having a base and a carrier member, in or on which the supply lines can be arranged. The carrier member is arranged guided displaceably reciprocatingly between a deflection position and a return position over a displacement travel (V) for length compensation in a compensating portion in two runs connected together by way of a direction-changing bend and each having a respective end connecting point. The guide system has a return device for returning the carrier member to the return position. The return device is provided with a direction-changing guide having a direction-changing element which is arranged variably in respect of position relative to the base and against which the direction-changing bend is laterally supported for guidance thereof over the displacement travel. For the return of the direction-changing element, a return force which can be detected by sensor means can act on the direction-changing element.

23 Claims, 9 Drawing Sheets

Figure 4A:
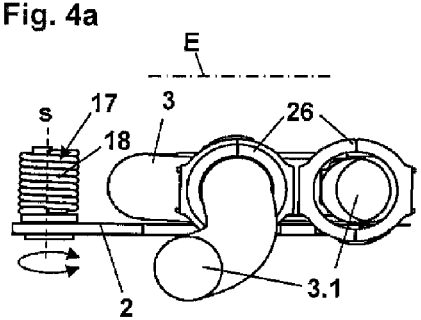

(51) Int. Cl.
*H02G 3/04* (2006.01)
*H02G 11/00* (2006.01)

(56) References Cited

FOREIGN PATENT DOCUMENTS

| DE | 102009037517 A1 * | 3/2011 | ........... B25J 19/0025 |
|---|---|---|---|
| EP | 2447016 A1 | 5/2012 | |
| JP | 60131382 U | 9/1985 | |
| JP | H02100793 U | 8/1990 | |
| JP | H03287391 A | 12/1991 | |
| JP | 2003306089 A | 10/2003 | |
| WO | 9739505 A1 | 10/1997 | |

OTHER PUBLICATIONS

English language translation of the PCT International Preliminary Report on Patentability and Written Opinion issued Oct. 2, 2013, received in corresponding PCT Application No. PCT/EP12/55715, 2 pgs.

* cited by examiner

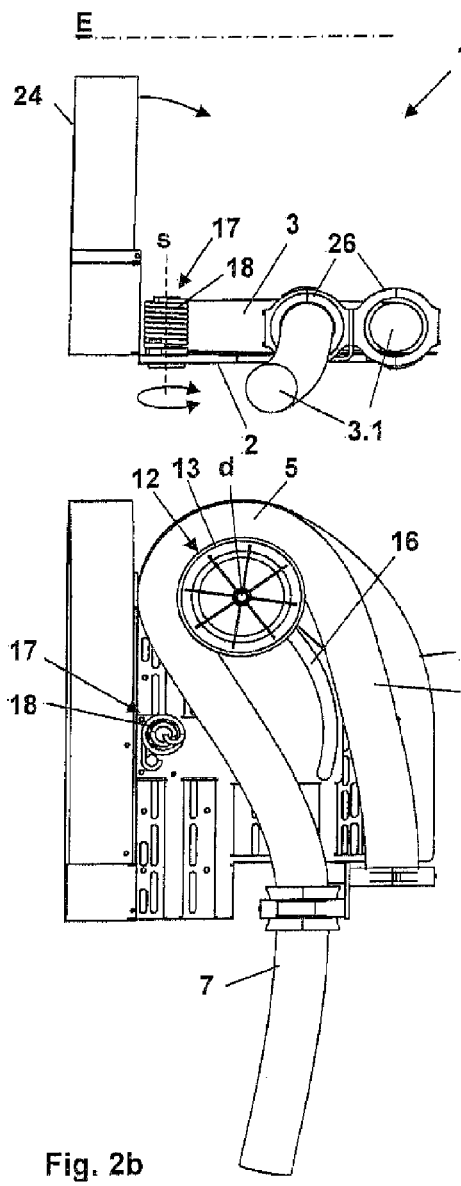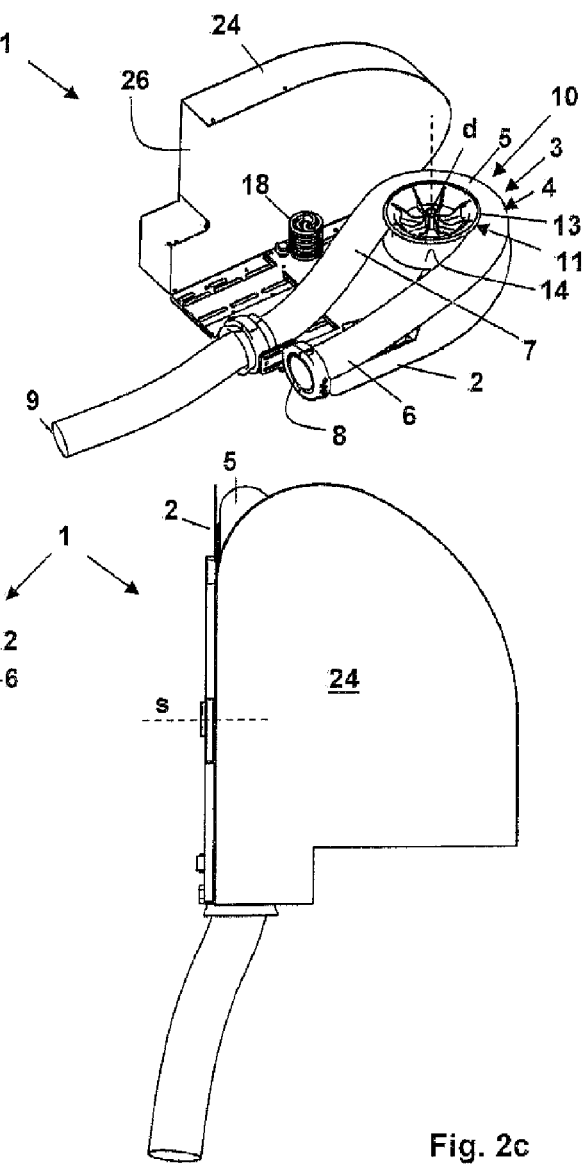

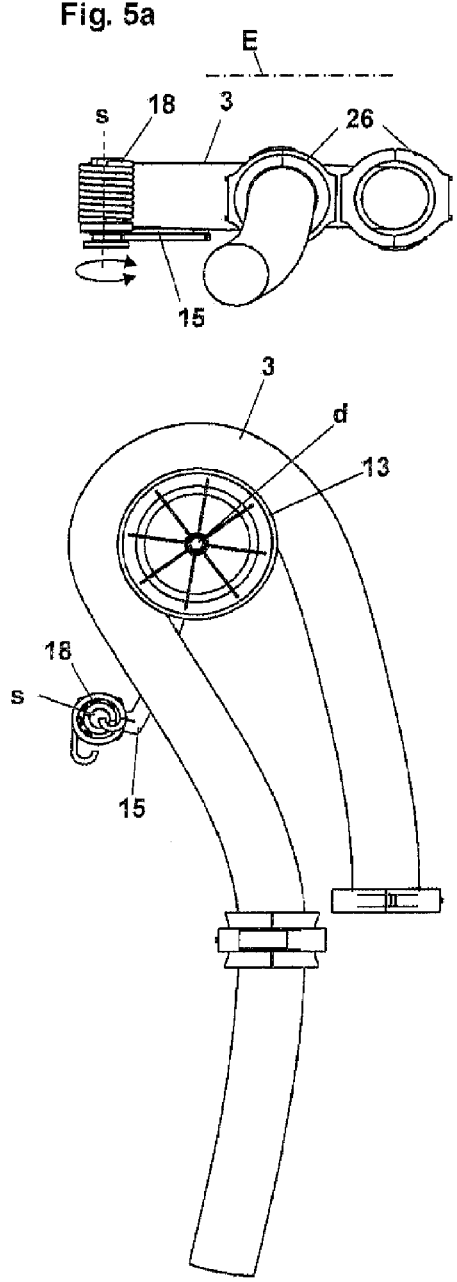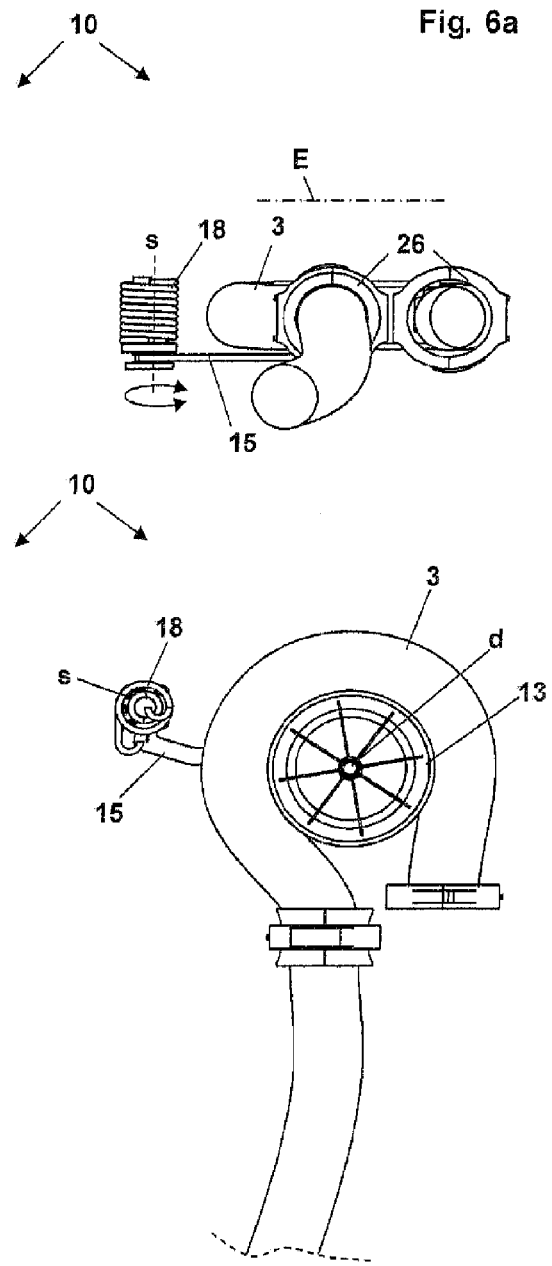

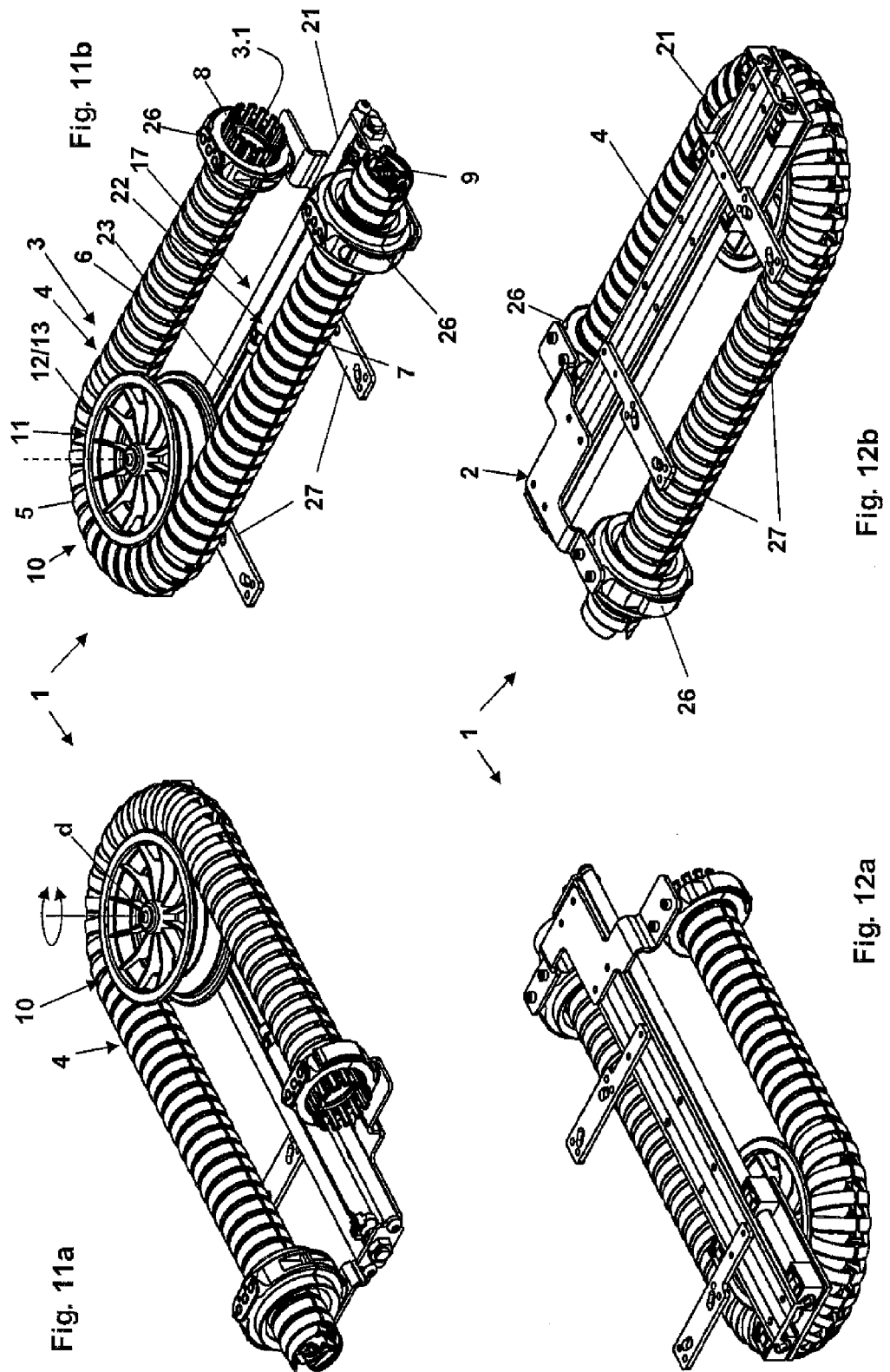

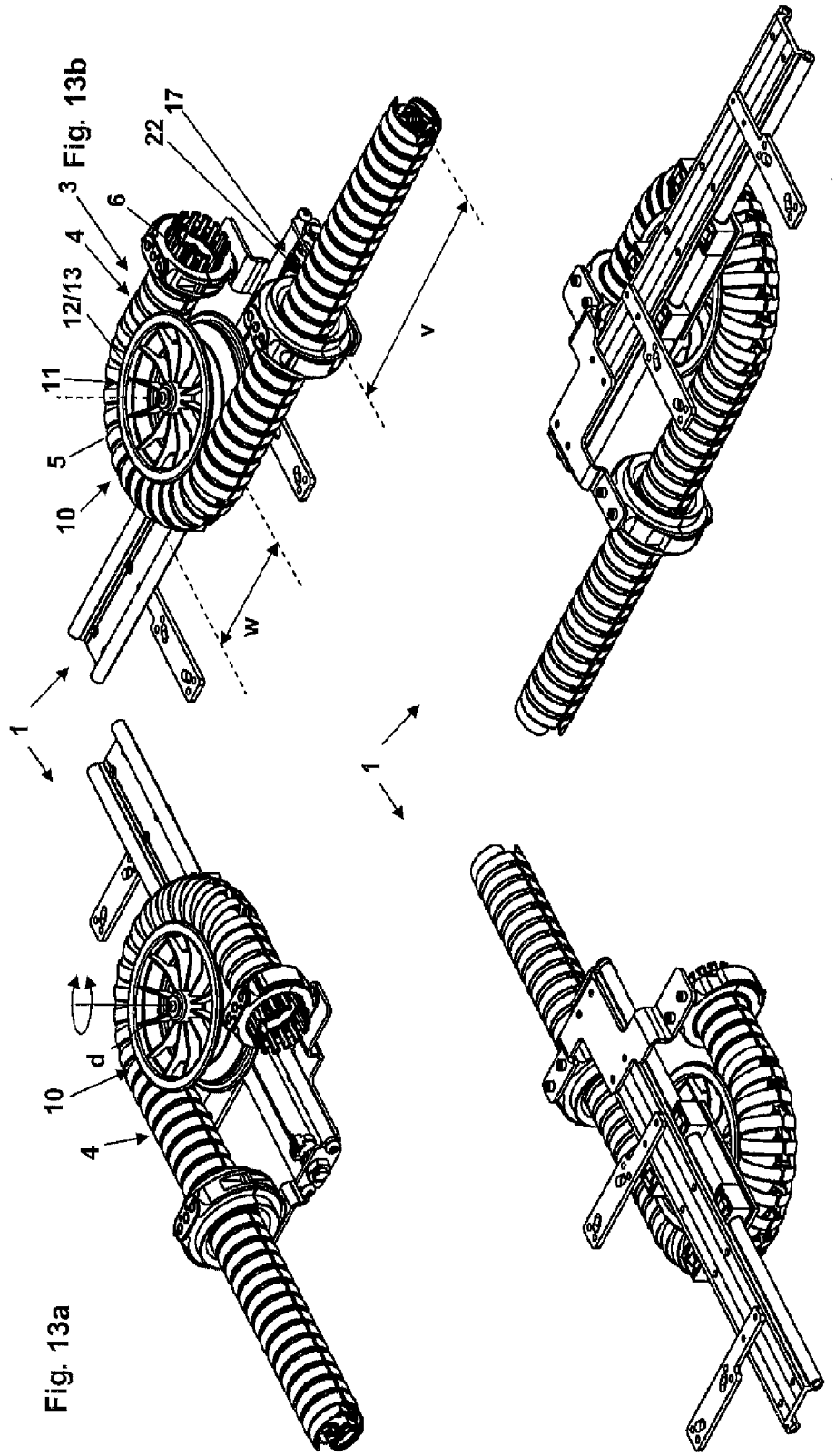

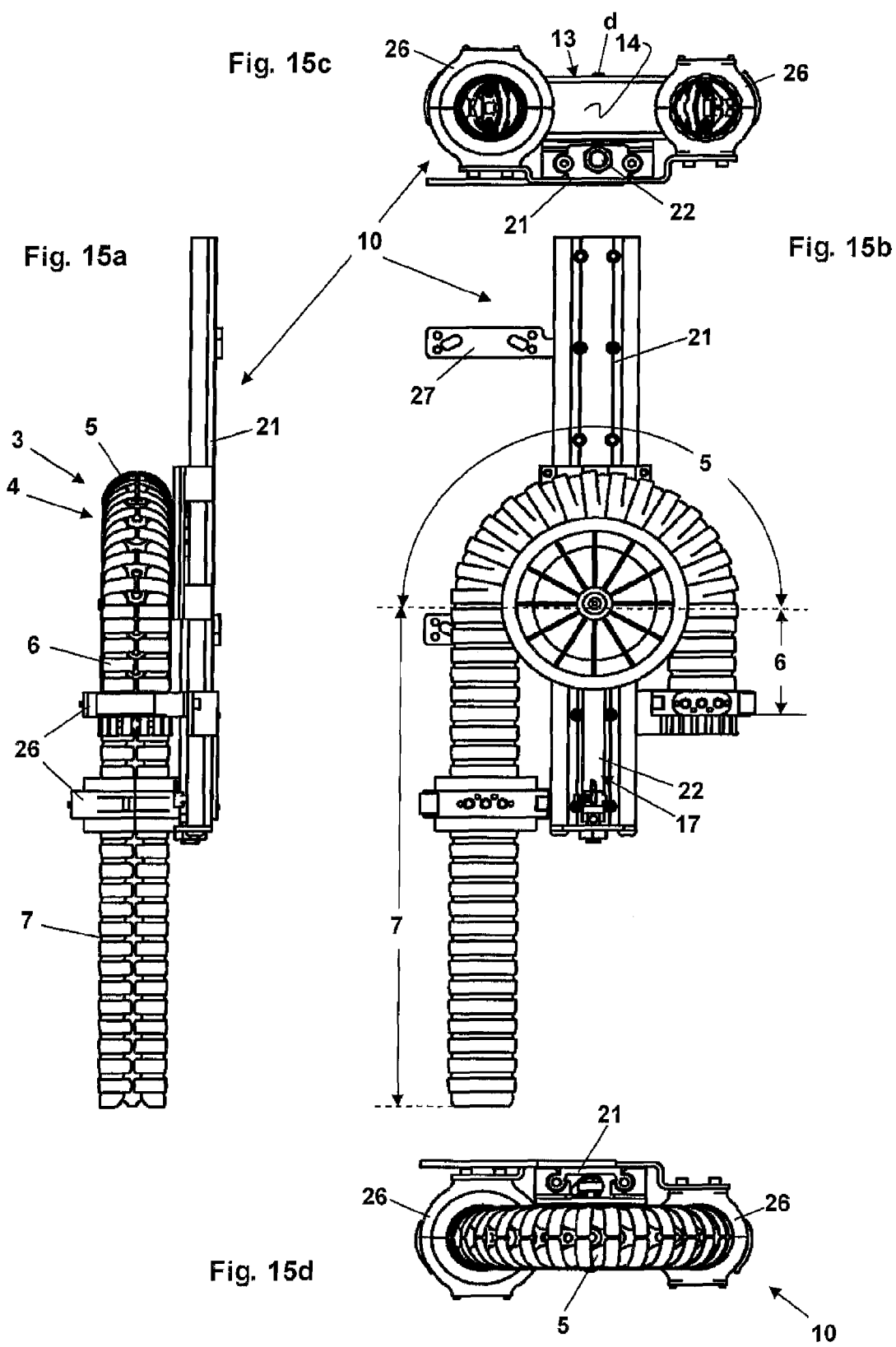

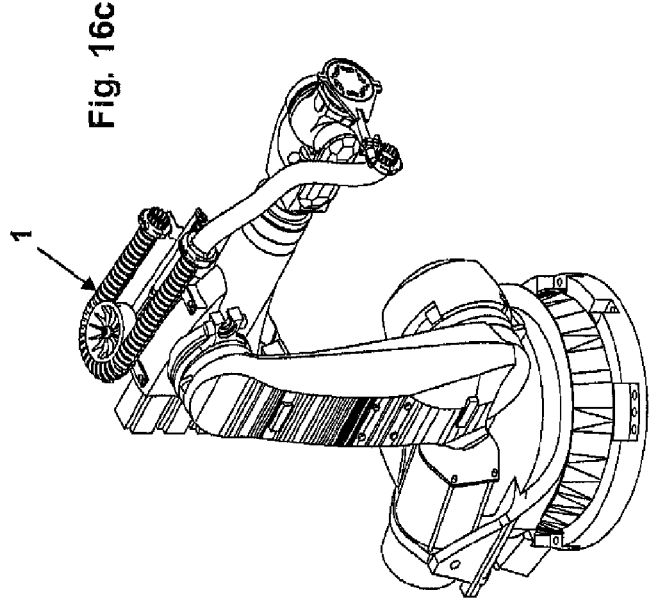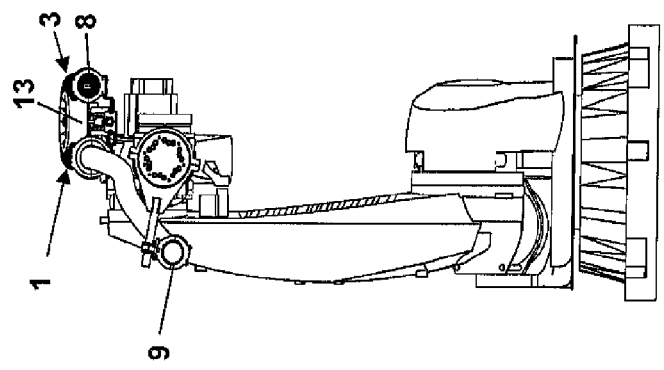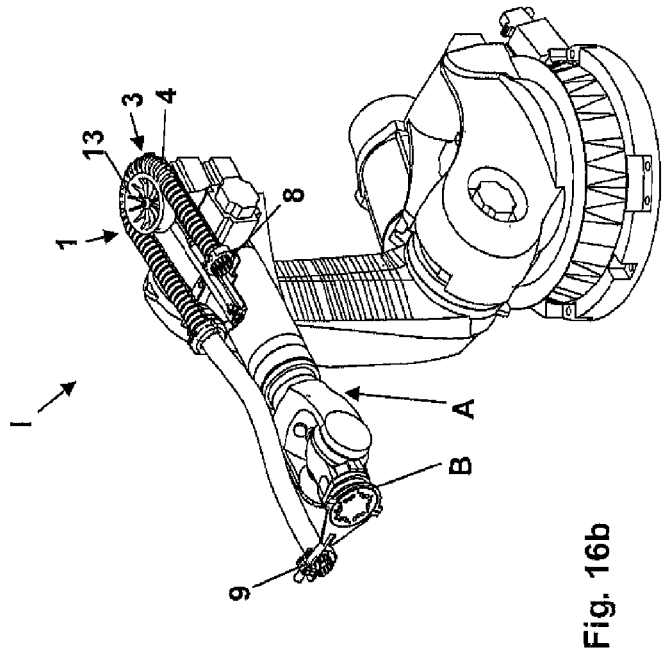

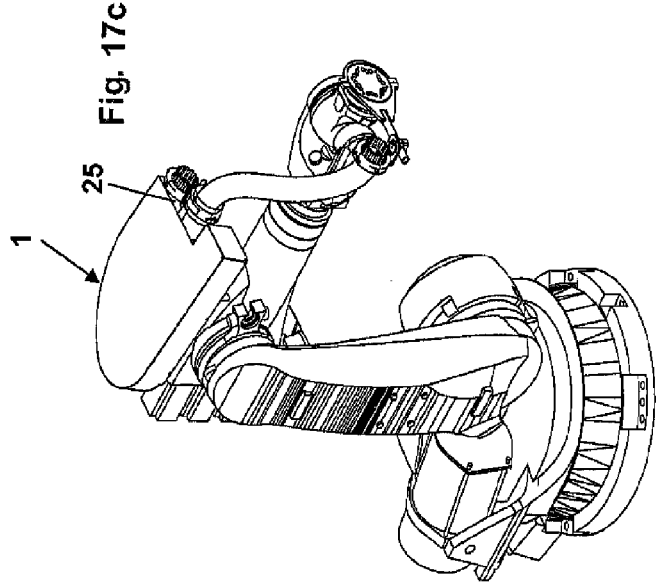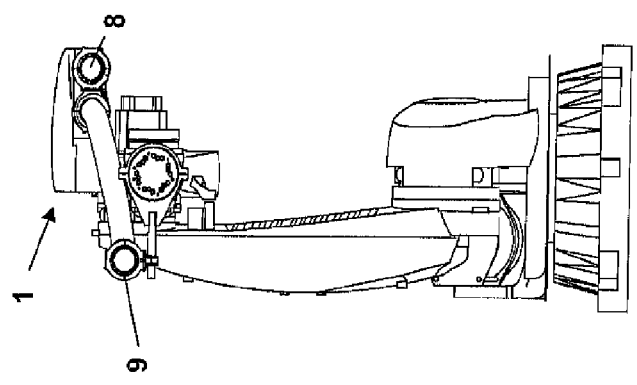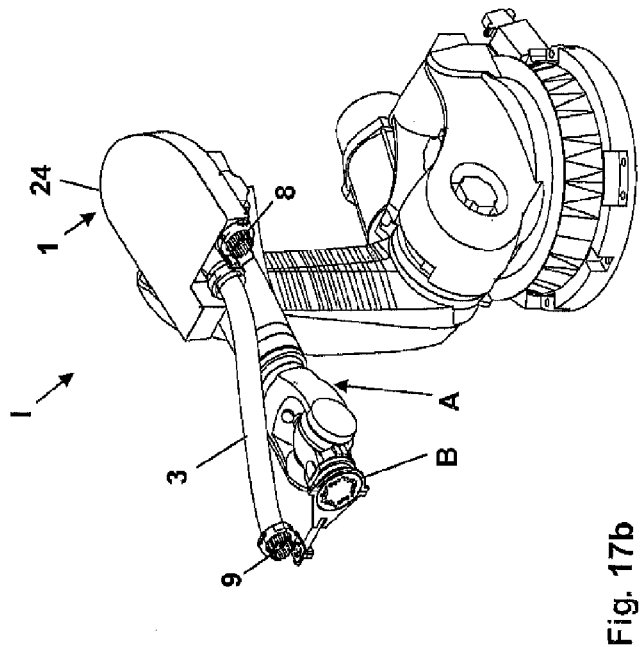

GUIDE SYSTEM FOR SUPPLY LINES AND A ROBOT WITH A GUIDE SYSTEM

The invention concerns a guide system for supply lines for a handling apparatus, in particular for an industrial robot, comprising a base and a chain-like, hose-like or strip-like carrier member, in or on which the supply lines can be arranged, wherein the carrier member is arranged guided for length compensation purposes in a compensating portion in two runs connected together by way of a direction-changing bend with respective end connecting points, a first connecting point which is stationary relative to the base of the guide system and a second connecting point which is movable relative to the base, the second connecting point is reciprocable relative to the first connecting point over a displacement travel between a deflection position in which the carrier member is extended and a return position in which the carrier member is retracted, and the guide system has a return device for returning the carrier member into the return position.

Handling apparatuses such as industrial robots have for example at a movable working end a working implement as a consumer which is supplied by way of supply lines. In general the carrier members with the supply lines are guided along the structure of the robots. Industrial robots are generally designed for rapid and frequently highly complex movements which require particularly precise guidance of the supply lines on or in the carrier member in order to avoid excessive loading of the carrier member and thus the supply lines for example as a consequence of being hooked on or entangled on the robot structure or as a consequence of the connecting member forming a loop. That can result in breakage of the carrier member and therewith the supply line guided thereby. Complex series of movements require a correspondingly great length compensation effect in regard to the carrier member so that it can follow the movements of the industrial robot. The state of the art proposes that a part of the length of the carrier member is returned from the deflection position to the return position by means of a return device.

WO 2005/123350A1 describes a guide system of the general kind set forth, wherein a spring arranged in a coil around the carrier member is deflected into the deflection position, for the return of a portion of the carrier member, the spring pulling the carrier member back again into the return position, with the return movement of the robot. The maximum possible length compensation effect is determined by the difference in the length of the spring in the relaxed condition and the compressed condition of the spring.

In a guide system which is also of the general kind set forth, in accordance with DE 20 2010 007 251 U1, the return device engages in force-transmitting relationship a chain member in the form of a connecting member by way of a spring-biased cable, in a complicated and expensive arrangement, so that the carrier member which in that case is in the form of a chain is retracted within a housing into the return position.

In DE 10 2007 018 543 A1 the connecting member is guided from the first connecting point in a rotary lever radially outwardly to a connecting element which is guided on a circular arc with rotation of the rotary lever, with the development of a semicircular direction-changing bend. In this case too there is a spring embracing the carrier member in a coil form for the return movement.

A disadvantage, besides twisting of the lines in the first connecting point, is the relatively slight length compensation that is possible for the carrier member.

The object of the invention is to provide a guide system of the general kind set forth, by means of which a conventional carrier member can be guided in a reliable and uncomplicated and inexpensive fashion, with increased length compensation.

The object is already attained in that the return device has a direction-changing guide with a direction-changing element at which the direction-changing bend is supported laterally for guidance thereof over the displacement travel, wherein the direction-changing element is arranged reciprocably in variable-position relationship with at least one travel component in the direction of the displacement travel relative to the base between the deflection position and the return position.

In that way, with displacement of the carrier member from the return position into the deflection position, there can be a displacement of the carrier member over the displacement travel with a change in the position of the direction-changing bend which by way of its change in position is continuously laterally supported at the direction-changing element which moves with the direction-changing bend. The direction-changing element can be entrained with the direction-changing bend by virtue of its variable-position displaceability relative to the base with the extension of the carrier member into the deflection position by means of the force action of the direction-changing bend. That makes it possible to ensure continuous support for the direction-changing bend over the displacement travel of the carrier member between the positions. In accordance with the laws of mechanics, with a movement of the direction-changing element by an amount, the carrier member can be increased in length at the same time by double the amount. In that way the possible change in length in the system according to the invention is doubled in comparison with those of the state of the art. That in turn permits the system to be of a compact or reduced-size structure.

The direction-changing bend can bear against the direction-changing element in slidably displaceable or rollingly displaceable relationship. It will be understood from mechanics that support for the direction-changing bend can preferably be at the inside thereof. The direction-changing element can have a lateral guide surface for supporting the direction-changing bend, which surface extends at least approximately perpendicularly to a plane of the bend, in which the direction-changing bend is arranged. The guide surface can be of a cross-sectional profile which is preferably at least approximately congruent in shape with the side surface of the carrier member, with which the carrier member bears against the direction-changing element for guidance thereof. The direction-changing element can be arranged displaceably parallel to the plane of the bend.

The centre point angle or the bend portion of the direction-changing bend can be greater than/equal to 90° or $\pi/2$, preferably greater than/equal to 120° or $\frac{3}{4}\pi$ or ideally around 180° or $\pi$, wherein the latter is most favourable in terms of force mechanics.

It is also possible to provide for support for the direction-changing bend, which additionally can be at least partially at the outside of the direction-changing bend. It is possible for example to provide a tube bend element which is adapted to the radius of the direction-changing bend and through which the carrier member can be drawn in, for guidance thereof. At its outer radius the tube bend element can have an axial continuous slot for introduction of the carrier member thereinto.

The direction-changing element can be of an elongate configuration, in a simple structure. It can extend perpendicularly to the plane of the bend, in respect of its longitudinal extent. It can be of a half moon-like configuration or it can be in the nature of a segment of a circle, with an outer peripheral surface, at which the direction-changing bend is slidingly displaceably guided. It will be appreciated that, with sliding displaceability of the direction-changing bend at the direction-changing element, the lateral guide surface can be adapted to reduce friction, for example being Teflon-coated. For example small preferably cylindrical needle rollers with an axis of rotation preferably perpendicular to the plane of the bend, against which the direction-changing bend rollingly displaceably bears, can be arranged in the guide surface.

In a preferred configuration of the guide system the direction-changing element can be in the form of a direction-changing roller element or direction-changing roller which is preferably ball-mounted perpendicularly to the plane of the bend rotatably relative to the base, having an outer peripheral surface as a guide surface, against which the direction-changing bend rollingly displaceably bears.

The direction-changing element can be reciprocable on a linear or curved path with respect to the base between the deflection position and the return position. For that purpose the return device can for example have a linear or curved guide rail for the direction-changing element. The direction-changing element can rollingly displaceably or slidably displaceably engage into that guide rail with an end portion which for example has an armature.

In a preferred embodiment of the guide system the direction-changing element can be reciprocable between the deflection position and the return position by means of a lever arrangement in a curved shape, in particular in a circular curved shape. For that purpose the direction-changing device can have a pivotal lever mounted pivotably to the base, with a free end region in which the direction-changing element is arranged. In that case the pivot axis of the pivotal lever can preferably be arranged perpendicularly to the plane of the bend. That represents a particularly simple and mechanically robust solution.

The displacement of the direction-changing element and therewith that of the direction-changing bend bearing against the direction-changing element, with the carrier member being pulled into its return position, can be effected automatically, as is already known. If the consumer supplied by the supply line travels back on the handling machine or the robot, the carrier member can be correspondingly released and can be pulled back by way of the return device in the direction of its return position. In principle that could preferably be effected in regulated fashion by means of a motor drive like by means of a linear drive or a control motor. Automatic return by way of a return force applied to the direction-changing element, by a force device, is however preferred. In that arrangement the force device can be so designed that the return force generated is controlled or preferably regulated for example by way of the pulling force exerted on the carrier member by the consumer. In that way the carrier member can be held under a preferably constant tensile stress towards the consumer so that it is possible to avoid the carrier member unacceptably sagging down.

The force device can produce the required return force and apply it to the direction-changing element in various ways. That can be effected for example pneumatically, magnetically, electromagnetically and/or mechanically, here in particular in spring-mechanical fashion. For that purpose it is possible to use for example a pneumatic, magnetic and/or mechanical spring which preferably acts on the direction-changing element in force-transmitting relationship directly or by way of a force transmission arrangement such as a lever arrangement or a transmission arrangement. It is possible for example to use a pivotal lever having the direction-changing element in its free end region, which is engaged laterally by a pneumatic, magnetic and/or mechanical spring for the pivotal movement.

In a preferred configuration of the guide system it is provided that the direction-changing element is arranged under a prestressing in the return position, wherein the prestressing faces at least with one directional component in the direction of the return force. In that way the direction-changing bend can be fixed in position to the extent of the prestressing acting on the arrangement, in the return position. The use of a purely mechanical spring for producing the return force has the advantage that it can be easily and mechanically robustly implemented. Thus for example when using the pivotal lever with the direction-changing element in its free end region, it is possible to use a simple torsion spring arranged in the pivot axis of the pivotal lever.

If for example the return force is generated pneumatically, that is to say by means of a pressure cylinder with an extending pressure piston, that pneumatically generated return force can be readily and easily controlled and regulated. That has the advantage that the return force can advantageously be kept constant in that way. It is thus possible to control or regulate the entire movement of the direction-changing element by way of the level of and/or the change in the return force. In addition it is possible in that way to limit the travel of the direction-changing element so that corresponding mechanical end abutments are superfluous.

At least one sensor of a measuring device can be provided for detecting the return force, the change in position of the direction-changing element and/or a pressing pressure with which the direction-changing bend bears against the direction-changing element. In that way on the one hand displacement of the return element can be optimised, in dependence on the respective location of use of the guide system. Thus for example upon a change in the complicated series of movements, in particular in the case of a change in the speed of displacement of the consumer, the return force is correspondingly adjusted over the displacement travel. In addition end points of the displacement travel of the direction-changing element can be selectively adjusted by way of the control of the return force. In addition by way of the sensors, such as for example in the event of the carrier member tearing away at the consumer which thereby exerts extremely greatly reduced tensile force on the direction-changing element it is possible to act directly on the handling apparatus or the industrial robot in such a way that it automatically shuts down. If for example an object inadmissibly comes between the carrier member and the handling apparatus in such a way that the carrier member is thereby further stressed and thus exerts an increased tensile force on the direction-changing element, then emergency shut-down of the handling apparatus or the industrial robot can also be effected by way of sensor detection for example of the pressing pressure with which the direction-changing bend bears against the direction-changing element. The respective sensors for detection of the return force, the change in location of the direction-changing element and/or the pressing pressure can be of a usual design configuration, adapted to the respective task in question. For example for detecting the change in position of the direction-changing element, position sensors can be provided for linear travel measurement or angle sensors for angle measurement in the case of an arcuate change in the position of the direction-changing element. Accordingly measurement value acquisition can be effected in translatory or rotational relationship. In that case conventional position sensors of suitable structure can be employed. They can operate for example light-optically, capacitively, inductively, magnetic-inductively, magnetostrictively, electrically, for example in accordance with the eddy current process, or magnetically in accordance with the Hall effect. In that respect travel measurement as absolute travel measurement can start from a zero point or, as incremental travel measurement, which is preferred, it can measure only the positive or negative increase in the travel distance covered.

In general contact-less detection of the change in location of the direction-changing element is preferred, as is possible for example in capacitive, inductive, magneto-inductive or magnetostrictive fashion. Particularly preferably however potentiometers are used, that is to say rotary potentiometers when detecting a rotary movement and linear potentiometers when detecting a linear movement. In that respect incremental travel measurement is respectively preferred as no zero point actuation is provided for that.

The part of the carrier member, which does not belong to the compensating portion, can additionally be guided and supported by means of at least one further guide element. For that purpose, it is possible to use a conventional guide ring with a coating for reducing sliding friction, for example of Teflon, through which the carrier member is arranged guided in slidingly displaceable relationship and which is preferably adjustably mounted to the external structure of the handling apparatus.

The guide system can have a housing with a cover for protection purposes. The housing can have the base in the form of a housing bottom, to which the cover is pivotably hinged. In addition holding means can be provided preferably on the base for mounting to the handling apparatus.

The guide system can thus be completely prefabricated in the form of a module with the compensating portion, the return device and the force device and optionally with the measuring device and the control and regulating unit. Those modules can be supplied in various different configurations. Thus for example for converting the handling apparatus or the industrial robot, a modular guide system can be supplemented or replaced by another guide system adapted to the conversion. It is possible to provide sets with individual structural groups of the guide system. Individual or all structural groups can advantageously be included in different design configurations in the set.

Figure 3:
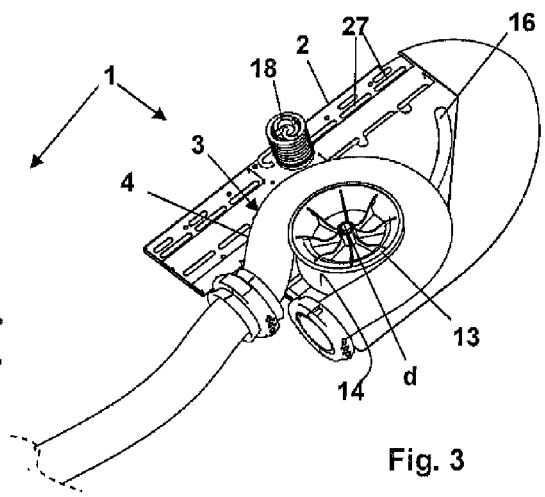
Figure 4B:
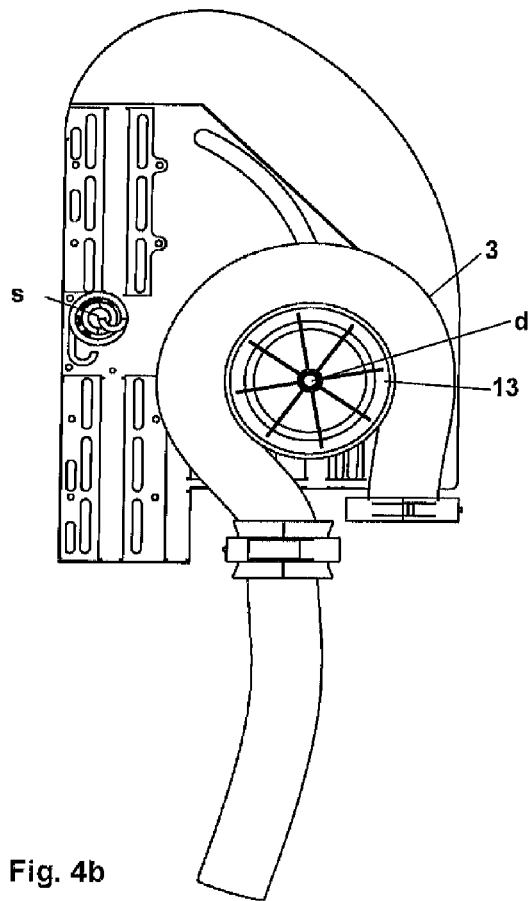
Figure 4C:
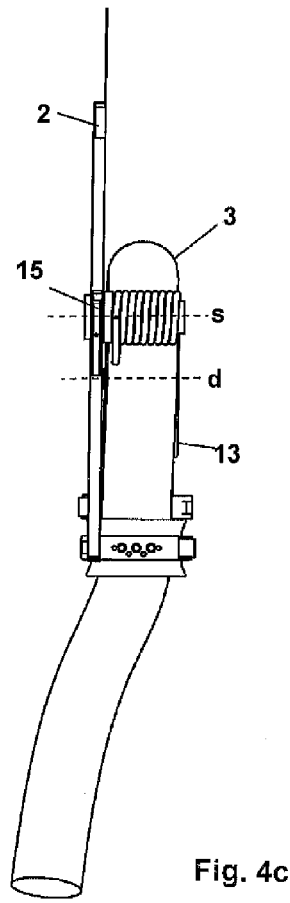
Figure 7:
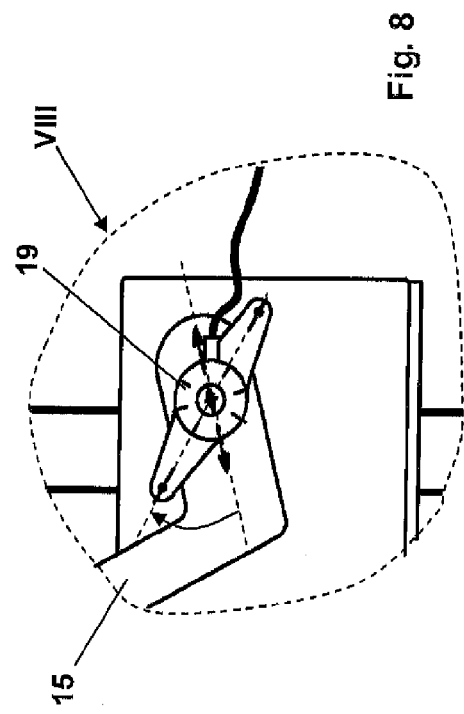
Figure 8:
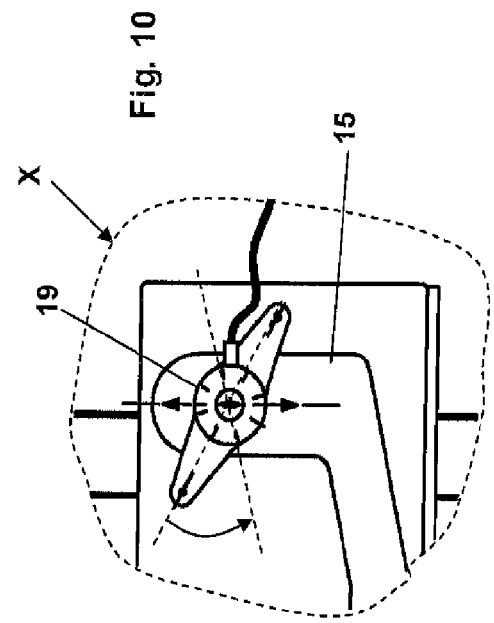
Figure 9:
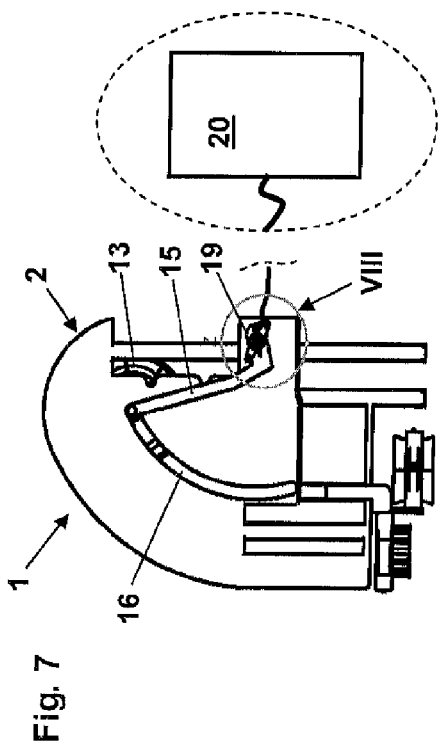
Figure 10:
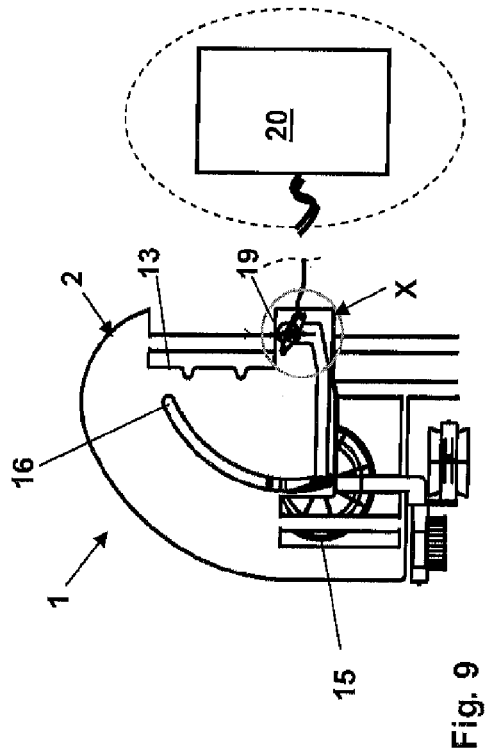

The present invention is described in greater detail hereinafter by means of embodiments illustrated in the drawing of the guide system or the handling apparatus with the guide system. In the drawing:

FIG. 1 shows a perspective plan view of a first embodiment of a guide system with opened cover and a direction-changing element in a return position, FIGS. 2a to 2c each show a side view of the first embodiment of the guide system of FIG. 1, FIG. 3 shows a perspective plan view of the first embodiment of the guide system of FIG. 1 but without a cover and with the direction-changing element in a deflection position, FIGS. 4a to 4c each show a view of the first embodiment of the guide system of FIG. 3, FIGS. 5a and 5b and FIGS. 6a and 6b respectively show a view of the first embodiment of FIG. 1 and FIG. 3 respectively, but without the base, FIG. 7 shows a view from below of the first embodiment of FIG. 1 without the carrier member, FIG. 8 shows the portion XIII shown in FIG. 7 on an enlarged scale, FIG. 9 shows a view from below of the first embodiment of the guide system of FIG. 3 but without the carrier member, FIG. 10 shows a portion X in FIG. 9 on an enlarged scale, FIGS. 11a and 11b and FIGS. 12a and 12b each show a view of a second embodiment of the guide system with the direction-changing element in the return position, FIGS. 13a and 13b and FIGS. 14a and 14b each show a view of the second embodiment of the guide system of FIGS. 11 and 12 but with the direction-changing element in the deflection position, FIGS. 15a to 15d each show a view of the second embodiment of the guide system of FIGS. 13 and 14, FIGS. 16a to 16c each show a view of an industrial robot with the guide system of FIGS. 11 and 12 without the cover, and FIGS. 17a to 17c each show a view of the industrial robot of FIG. 16 but with the first embodiment of the guide system and with the cover closed.

FIGS. 1 to 17 show various views and portions of two embodiments of a guide system 1 or parts thereof. FIGS. 16a to 16c and FIGS. 17a to 17c respectively show in various views an industrial robot I with a second embodiment of the guide system 1 according to FIGS. 11 to 15 and with a first embodiment of the guide system 1 as shown in FIGS. 1 to 10.

The guide system 1 is designed for supply lines (not further shown here) for a handling apparatus which here is in the form of an industrial robot I. Here the guide system 1 has a base 2 which here is plate-shaped and a carrier member 4 which here is in the form of a chain of circularly round cross-section and having an internal space 3.1 in which the supply lines (not shown here) can be arranged. As clearly shown in FIGS. 16 and 17 the guide system 1 is designed here to pass supply lines by way of the carrier member 3 to a consumer (not shown here) arranged at the end of an arm A of the industrial robot I, the arm A being variable in its length. For length compensation purposes the carrier member 3 is arranged in a compensating portion 4 which represents here solely the carrier member 3, in two runs 6, 7 which are connected together by way of a direction-changing bend 5 and which each have an end connecting point, a first connecting point 8 which is stationary relative to the base 2 of the guide system 1, and a second connecting point 9 which is movable relative to the base 2. The second connecting point 9 is reciprocatingly displaceable relative to the first connecting point 8 over a displacement travel V between a deflection position (FIGS. 3, 4 and 9 and FIGS. 13, 14 and 15) in which the carrier member 3 is extended, and a return position (FIGS. 1, 2 and 7 and FIGS. 11, 12 and 16 respectively) in which the carrier member 3 is retracted.

The guide system 1 further has a return device 10 for here automatic return of the carrier member into the return position. The return device 10 has a direction-changing guide 11 with a direction-changing element 12. Here the direction-changing element in both embodiments of the guide system is in the form of a direction-changing roller 13, wherein the direction-changing roller 13 is mounted freely rotatably about an axis of rotation d perpendicularly to a bend plane E in which the direction-changing bend 5 is arranged. The direction-changing bend 5 bears against the direction-changing roller 13 in rollingly displaceable relationship for guidance of the former over the displacement travel v of the second connecting point 9. The direction-changing element 12 is arranged reciprocatingly displaceably at least with a travel component in the direction of the displacement travel v variably in position with respect to the base 2 between the deflection position and the return position. As is known from the mechanics of direction-changing rollers and as is diagrammatically shown in FIG. 15b the displacement travel v of the second connecting point 9 is twice as great as the travel w covered by the direction-changing roller 13 upon displacement of the first connecting point 8. Thus, over the travel distance w of the direction-changing roller, a maximum displacement travel v can be set at the same time.

The direction-changing roller 13 has a lateral guide surface 14 for the direction-changing bend 5. The lateral guide surface 14 is adapted to the outside contour of the direction-changing bend 5, that is to say, here, to correspond to the circular cross-section of the carrier member 3, it is of a concave semicircular configuration.

The fundamental difference between the two embodiments of the guide system is in particular that the direction-changing system in the first embodiment of the guide system 1 is displaced on a travel path w in the form of a circular arc while the direction-changing roller 13 in the second embodiment of the guide system 1 as shown in FIGS. 11 to 15 is displaced on a linear travel path w.

For that purpose the return device 10 in the first embodiment of the guide system has a pivotal lever 15 which is mounted to the base 2 pivotably about a pivot axis s parallel to the axis of rotation d of the direction-changing roller 13. The direction-changing roller 13 is mounted rotatably at a free end of the pivotal lever 15, that is spaced from the pivot axis s. The pivotal lever 15 is here arranged beneath the base 2 so that the direction-changing roller arranged above the base 2 engages the pivotal lever 15 with its axis of rotation d through the base 2. For that purpose, provided in the base 2 is an arcuate slot 16 which at the same time marks a maximum travel distance w for the direction-changing roller 13.

For automatic return of the direction-changing element 12 into its return position there is provided a force device 17 for producing a return force and applying it to the direction-changing element 12.

In the first embodiment of the guide system 1 the direction-changing element 12 in the return position bears in a pre-stressed condition at the end against the slot 16. The force-generating element here is a torsion spring 18, against the spring force of which the pivotal lever 15 is deflected out of the return position in a direction towards the deflection position. For measuring the displacement of the direction-changing element 12 over the travel distance w into the slot 16, there is an angle sensor 19 which, as shown in FIGS. 7 to 10, is arranged at the underside of the pivot axis s of the pivotal lever 15. The angle sensor 19 is here in the form of an incremental Hall sensor which advantageously operates in contact-less fashion. As purely diagrammatically shown in FIGS. 7 and 9 the angle sensor 19 is connected to a control and regulating unit 20, by way of which it is possible inter alia to act on control and regulation of the industrial robot I in such a way that the industrial robot I is automatically switched off in the event of an abrupt pivotal movement of the pivotal lever 15.

In the second embodiment of the guide system 1 as shown in FIGS. 11 to 15 the direction-changing element 12 is displaced on a linear travel path w arranged parallel to the displacement travel path v of the second drive point 9. For that purpose the direction-changing roller 13 engages in slidingly displaceable relationship with its axis of rotation d into a guide rail 21 with an armature (not visible here). To maintain the return force this arrangement includes a pneumatic pressure cylinder 22 which with its pressure ram 23 engages the armature (not shown here) of the axis of rotation d. The pressure cylinder 20 is controllable by way of the control and regulating unit, although this is not shown here. Thus, actuation of the pressure cylinder 22 can be co-ordinated with the movement of the arm A of the robot E and/or can be controlled or regulated by way of pressure measurement of the pressing pressure of the direction-changing bend 5 at the direction-changing element 12, although this is also not shown in the Figures. In addition the limits of the travel w for the displacement of the direction-changing element 12 can be adjusted by way of a travel length of the pressure ram 23.

In both embodiments of the guide system 1 there is provided a cover 24 pivotably hinged to the base 2. The two runs 6, 7 of the compensating portion can be reached at the ends for the connection for example to further parts of the carrier member 3 or, as shown in FIGS. 16 and 17, for connection to a working end B of the arm A, from the exterior at openings 25 defined by the base 2 and the cover 24. The two openings 25 respectively extend around a ring-like guide element 26 which is stationary relative to the base 2, wherein the guide element 26 for the first connecting point 8 serves at the same time as a stationary holder while the other guide element 26 is in the form of a sliding ring, by which the run 7 is slidingly displaceably guided with the movable connecting point 9. Holding means 27 are provided at the underside of the base 2 for fastening the guide system 1 to the industrial robot I.

LIST OF REFERENCES 1 guide system
2 base
3 carrier member
3.1 internal space
4 compensating portion
5 direction-changing bend
6 run
7 run
8 first connecting point
9 second connecting point
10 return device
11 direction-changing guide
12 direction-changing element
13 direction-changing roller
14 guide surface
15 pivotal lever
16 slot
17 force device
18 torsion spring
19 angle sensor
20 control and regulating unit
21 guide rail
22 pressure cylinder
23 pressure ram
24 cover
25 opening
26 guide element
27 holding means
A arm
B working end
E bend plane
I industrial robot
d axis of rotation
s pivot axis
v displacement travel
w travel

What is claimed is:

1. A guide system for supply lines for a handling apparatus, comprising: a base and a carrier member, in or on which the supply lines are arrangeable, wherein the carrier member is arranged guided for length compensation purposes in a compensating portion in two runs connected together by way of a direction-changing bend with respective end connecting points, a first connecting point which is stationary relative to the base of the guide system and a second connecting point which is movable relative to the base, the second connecting point is reciprocable relative to the first connecting point over a displacement travel between a deflection position in which the carrier member is extended and a return position in which the carrier member is retracted, and the guide system has a return device for returning the carrier member into the return position, wherein the return device has a direction-changing guide with a direction-changing element at which the direction-changing bend is supported laterally for guidance thereof over the displacement travel, wherein the direction-changing element is arranged reciprocably in variable-position relationship with at least one travel component in the direction of the displacement travel relative to the base between the deflection position and the return position, wherein the direction-changing element has a lateral guide surface for the direction-changing bend, which surface extends at least approximately perpendicularly to a bend plane in which the direction-changing bend is arranged, and wherein the direction-changing element is in the form of a direction-changing roller element or direction-changing roller which is mounted perpendicularly to the bend plane rotatably relative to the base and against which the direction-changing bend laterally bears.

2. The guide system according to claim 1 wherein the direction-changing element is displaceable between the positions on at least one of a linear and an arcuate travel path.

3. The guide system according to claim 1 wherein the return device has at least one of a linear or curved guide rail for the direction-changing element, into which the direction-changing element displaceably engages with an end portion.

4. The guide system according to claim 1 wherein the return device for automatic return has a force device for applying a return force to the direction-changing element from the deflection position to the return position.

5. The guide system according to claim 4 wherein the return force is applied at least one of pneumatically, magnetically, electromagnetically and mechanically.

6. The guide system according to claim 1 wherein the direction-changing element is arranged in a prestressed condition in the return position.

7. The guide system according to claim 1 wherein the run with the second connecting point is arranged guided through a guide element which is stationary relative to the base.

8. The guide system according to claim 1 wherein at least one of the magnitude of and the change in the return force is controlled or regulated.

9. The guide system according to claim 1 wherein the handling apparatus comprises an industrial robot, and the guide system is positioned on the industrial robot.

10. A handling apparatus, in particular an industrial robot, having a guide system for supply lines comprising: a base and a carrier member, in or on which the supply lines are arrangeable, wherein the carrier member is arranged guided for length compensation purposes in a compensating portion in two runs connected together by way of a direction-changing bend with respective end connecting points, a first connecting point which is stationary relative to the base of the guide system and a second connecting point which is movable relative to the base, the second connecting point is reciprocable relative to the first connecting point over a displacement travel between a deflection position in which the carrier member is extended and a return position in which the carrier member is retracted, and the guide system has a return device for returning the carrier member into the return position, wherein the return device has a direction-changing guide with a direction-changing element at which the direction-changing bend is supported laterally for guidance thereof over the displacement travel, wherein the direction-changing element is arranged reciprocably in variable-position relationship with at least one travel component in the direction of the displacement travel relative to the base between the deflection position and the return position and the guide system has a measuring device with a sensor producing measurement signals for detection of at least one of the return force, the change in location of the direction-changing element and a pressing pressure with which the direction-changing bend bears against the direction-changing element, wherein the measuring signals are linkable to a provided control or regulation of the handling apparatus or industrial robot.

11. A guide system for supply lines for a handling apparatus, comprising: a base and a carrier member, in or on which the supply lines are arrangeable, wherein the carrier member is arranged guided for length compensation purposes in a compensating portion in two runs connected together by way of a direction-changing bend with respective end connecting points, a first connecting point which is stationary relative to the base of the guide system and a second connecting point which is movable relative to the base, the second connecting point is reciprocable relative to the first connecting point over a displacement travel between a deflection position in which the carrier member is extended and a return position in which the carrier member is retracted, and the guide system has a return device for returning the carrier member into the return position, wherein the return device has a direction-changing guide with a direction-changing element at which the direction-changing bend is supported laterally for guidance thereof over the displacement travel, wherein the direction-changing element is arranged reciprocably in variable-position relationship with at least one travel component in the direction of the displacement travel relative to the base between the deflection position and the return position, wherein the direction-changing element is displaceable between the positions by means of a lever arrangement in an arcuate shape, in particular in the shape of a circular arc, and wherein the direction-changing device has a pivotal lever which is mounted to the base pivotably about a pivot axis parallel to the longitudinal extent of the direction-changing element and which has a free end region in which the direction-changing element is arranged.

12. The guide system according to claim 11 wherein the return device has at least one of a linear or curved guide rail for the direction-changing element, into which the direction-changing element displaceably engages with an end portion.

13. The guide system according to claim 11 wherein the return device for automatic return has a force device for applying a return force to the direction-changing element from the deflection position to the return position.

14. The guide system according to claim 13 wherein the return force is applied at least one of pneumatically, magnetically, electromagnetically and mechanically.

15. The guide system according to claim 11 wherein the direction-changing element is arranged in a prestressed condition in the return position.

16. The guide system according to claim 11 wherein the run with the second connecting point is arranged guided through a guide element which is stationary relative to the base.

17. The guide system according to claim 11 wherein at least one of the magnitude of and the change in the return force is controlled or regulated.

18. The guide system according to claim 11 wherein the handling apparatus comprises an industrial robot, and the guide system is positioned on the industrial robot.

19. The guide system according to claim 11 wherein the handling apparatus comprises an industrial robot, and the guide system is positioned on the industrial robot.

20. A guide system for supply lines for a handling apparatus, comprising: a base and a carrier member, in or on which the supply lines are arrangeable, wherein the carrier member is arranged guided for length compensation purposes in a compensating portion in two runs connected together by way of a direction-changing bend with respective end connecting points, a first connecting point which is stationary relative to the base of the guide system and a second connecting point which is movable relative to the base, the second connecting point is reciprocable relative to the first connecting point over a displacement travel between a deflection position in which the carrier member is extended and a return position in which the carrier member is retracted, and the guide system has a return device for returning the carrier member into the return position, wherein the return device has a direction-changing guide with a direction-changing element at which the direction-changing bend is supported laterally for guidance thereof over the displacement travel, wherein the direction-changing element is arranged reciprocably in variable-position relationship with at least one travel component in the direction of the displacement travel relative to the base between the deflection position and the return position, wherein there is provided a measuring device having a sensor for detecting at least one of the return force, the change in location of the direction-changing element and a pressing pressure with which the direction-changing bend bears against the direction-changing element.

21. The guide system according to claim 20 wherein detection of the change in location of the direction-changing element is effected contact-lessly.

22. The guide system according to claim 20 wherein the sensor produces a signal for controlling or regulating the return force.

23. The guide system according to claim 20 wherein the sensors produce a signal which are useable for controlling the handling apparatus.

* * * * *